United States Patent
Kim et al.

(10) Patent No.: US 8,295,705 B2
(45) Date of Patent: Oct. 23, 2012

(54) VISIBLE LIGHT COMMUNICATION METHOD AND SYSTEM

(75) Inventors: Do-Young Kim, Yongin-si (KR); Dae-Seok Kim, Seoul (KR); Eun-Tae Won, Seoul (KR)

(73) Assignee: Samsung Electronics Co., Ltd (KR)

( * ) Notice: Subject to any disclaimer, the term of this patent is extended or adjusted under 35 U.S.C. 154(b) by 590 days.

(21) Appl. No.: 12/486,184

(22) Filed: Jun. 17, 2009

(65) Prior Publication Data

US 2009/0310971 A1    Dec. 17, 2009

(30) Foreign Application Priority Data

Jun. 17, 2008    (KR) .................... 10-2008-0057049

(51) Int. Cl.
*H04B 10/00*    (2006.01)
(52) U.S. Cl. ............ 398/103; 398/98; 398/118
(58) Field of Classification Search ............ 398/107, 398/108, 109, 47, 52, 58, 66, 69, 75, 78, 398/79, 89, 98, 99, 100, 118, 115, 117, 127, 398/130, 103
See application file for complete search history.

(56) References Cited

U.S. PATENT DOCUMENTS
2004/0246933 A1 * 12/2004 Valko et al. ............... 370/338

FOREIGN PATENT DOCUMENTS
| JP | 2007-208309 |   | 8/2007 |
| JP | 2007208309 | * | 8/2007 |
| KR | 1020080022298 | * | 3/2008 |

* cited by examiner

*Primary Examiner* — M. R. Sedighian
(74) *Attorney, Agent, or Firm* — The Farrell Law Firm, P.C.

(57) ABSTRACT

A time-sharing Visible Light Communication (VLC) system is provided. Two or more light sources transmit data received from one or more VLC terminals located in its service area to a communication control device, and transmits data received from the communication control device to the one or more VLC terminals. The communication control device determines and groups at least one of the two or more light sources to be included in a cell according to a generated user service, maps the grouped at least one light source to the cell, allocates a time slot used to provide the user service to the cell, transmits data associated with the user service to at least one of the one or more VLC terminals through the at least one light source mapped to the cell using the allocated time slot, detects a location of the at least one VLC terminal located in a service area of the cell on a real-time basis, and remaps the cell according to the detected location.

22 Claims, 15 Drawing Sheets

VISIBLE LIGHT COMMUNICATION METHOD AND SYSTEM

PRIORITY

This application claims priority under 35 U.S.C. §119(a) to a Korean Patent Application filed in the Korean Intellectual Property Office on Jun. 17, 2008 and assigned Serial No. 10-2008-0057049, the entire disclosure of which is incorporated herein by reference.

BACKGROUND OF THE INVENTION

1. Field of the Invention

The present invention relates generally to a Visible Light Communication (VLC) method and system, and more particularly, to a VLC method and system using a time-sharing scheme.

2. Description of the Related Art

As the luminous efficiency of Light Emitting Diodes (LEDs) has improved and their price has fallen, the use of LEDs has become popular not only in the special lighting markets for portable devices, displays, automobiles, traffic lights, billboards, or the like, but also in the general lighting markets for fluorescent lamps, incandescent electric lamps, or the like. In addition, studies of VLC using visible light LEDs are being made in many enterprises, as the interest in an optical wireless technology that complements a Radio Frequency (RF) technology increases due to exhaustion of RF band frequencies, possible conflict between several wireless communication technologies, increased demand for communication security, advent of super-high speed ubiquitous communication environments in a $4^{th}$ Generation (4G) wireless technology, etc.

VLC that communicates information using visible light is secure and its bandwidth is broad and can be freely used without restriction. In addition, since VLC makes it possible for users to see the places where the light arrives, and the direction in which the light propagates, the users may accurately perceive the coverage where the light can be received. Therefore, VLC is advantageous in that it is reliable in terms of security and can be driven with low power. Due to these advantages, VLC is applicable even in hospitals and airplanes where the use of RF is generally banned. Also, VLC can provide value-added services. A description of the VLC system will be given below with reference to drawings.

FIG. 1 illustrates a configuration of a general system using VLC (hereinafter referred to as a "VLC system"). The general VLC system includes a light source(s) 10 and a VLC terminal 20. The light source 10 is composed of a plurality of LEDs or Laser Diodes (LDs) to serve as a lighting apparatus and perform data transmission/reception using visible light. The VLC terminal 20 includes a visible light transmission/reception module to perform data exchange with the light source 10. The VLC terminal 20 may include mobile terminals such as a mobile phone and a Personal Digital Assistant (PDA), and fixed terminals such as a desktop computer. In addition, VLC may be combined with communication systems using other wire/wireless communication media, to ensure more efficient use.

A general structure of the VLC terminal 20 is illustrated in FIG. 2. Referring to FIG. 2, the VLC terminal 20 includes a transmission/reception controller 21, an encoder 22, an LED driver 23, an LED 24, a photodiode 25, a detector/receiver 26, and a decoder 27.

The transmission/reception controller 21, which controls the overall operation of the VLC terminal 20, processes data for VLC data transmission/reception by controlling the encoder 22 and the decoder 27. The encoder 22 encodes transmission data input from the transmission/reception controller 21 and outputs the encoded transmission data to the LED driver 23. The LED driver 23 optically modulates the data input from the encoder 22, and drives the LED 24 so that the transmission data can be transferred to an external device.

The photodiode 25 senses an optical signal provided from the external device, converts the sensed optical signal into an electrical signal, and outputs the electrical signal to the detector/receiver 26. The detector/receiver 26 demodulates the electrical signal input from the photodiode 25 into data that is based on optical wireless communication, and outputs the demodulated data to the decoder 27. The decoder 27 decodes input data and outputs the decoded data to the transmission/reception controller 21, and the transmission/reception controller 21 properly processes the received data input from the decoder 27.

Meanwhile, when VLC services are to be provided in a broad space, a plurality of light sources 10 are installed in the space depending on service coverage of each light source 10. For example, as illustrated in FIG. 3, a plurality of light sources 10 can be installed on the ceiling of one room in a lattice form at specified intervals, taking into account a unit service area in which each light source 10 can provide VLC services.

When a plurality of light sources 10 are installed at specified intervals as illustrated in FIG. 3, substantial service areas of the light sources 10 may appear in three possible cases as shown in FIGS. 4A to 4C, in which service areas of two light sources 31 and 33 are shown by way of example. In this situation, the service areas of the light sources 31 and 33 may partially overlap each other as shown in FIG. 4A, may contact with each other at their edges as shown in FIG. 4B, or may be spaced apart from each other as shown in FIG. 4C, providing a non-service area 43 between the service areas. The case of FIG. 4B, which is an ideal state, is substantially impossible. Generally, the service areas of the multiple light sources may include an overlapping area where they overlap in part as shown in FIG. 4A, or a non-service area may exist between two service areas as shown in FIG. 4C.

However, when the light source 31 and the light source 33 provide different types of services, collisions may occur between data transmitted by the two services in the overlapping area, making it difficult to provide normal services. Further, normal VLC communication is impossible in the non-service area. In order for adjacent light sources to normally provide VLC services, they provide the same services to all users, placing a limit on the capability of VLC.

SUMMARY OF THE INVENTION

The present invention has been made to address at least the above problems and/or disadvantages and to provide at least the advantages described below. Accordingly, an aspect of the present invention provides a VLC method and system for providing VLC services using a plurality of adjacent light sources such that various services can be provided to each of users.

Another aspect of the present invention provides a VLC method and system for enabling VLC communication even in overlapping service areas of a plurality of light sources that provide different services.

A further aspect of the present invention provides a VLC method and system capable of preventing waste of resources by efficiently using light sources of a VLC system.

According to one aspect of the present invention, a time-sharing Visible Light Communication (VLC) system is provided. The VLC system includes one or more light sources for transmitting data received from one or more VLC terminals located in its service area to a communication control device, and for transmitting data received from the communication control device to the one or more VLC terminals. The VLC system also includes the communication control device for determining and grouping at least one of the one or more light sources to be included in a cell according to a generated user service. The at lest one grouped light source is mapped to the cell. A time slot used to provide the user service to the cell is allocated. Data associated with the user service is transmitted to the at least one VLC terminal through the at least one light source mapped to the cell using the allocated time slot. A location of the at least one VLC terminal located in a service area of the cell is detected on a real-time basis, and the cell is remapped according to the detected location.

According to another aspect of the present invention, there a time-sharing Visible Light Communication (VLC) method performed by a communication control device is provided. The communication control device is in a VLC system that includes one or more light sources that transmit data received from one or more VLC terminals located in its service area to the communication control device and transmits data received from the communication control device to one or more VLC terminals. Upon receipt of a request for a specific user service, at least one of the one or more light sources is determined and grouped to be included in a cell according to the user service. The grouped at least one light source is mapped to the cell. A time slot is allocated that is used to provide the user service to the one cell. Data associated with the user service is transmitted to the at least one VLC terminal located in a service area of the cell through the at least one light source mapped to the cell using the allocated time slot. A location of at least one VLC terminal located in the service area is detected. The cell is remapped according to the detected location.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF PREFERRED EMBODIMENTS

Figure 1:
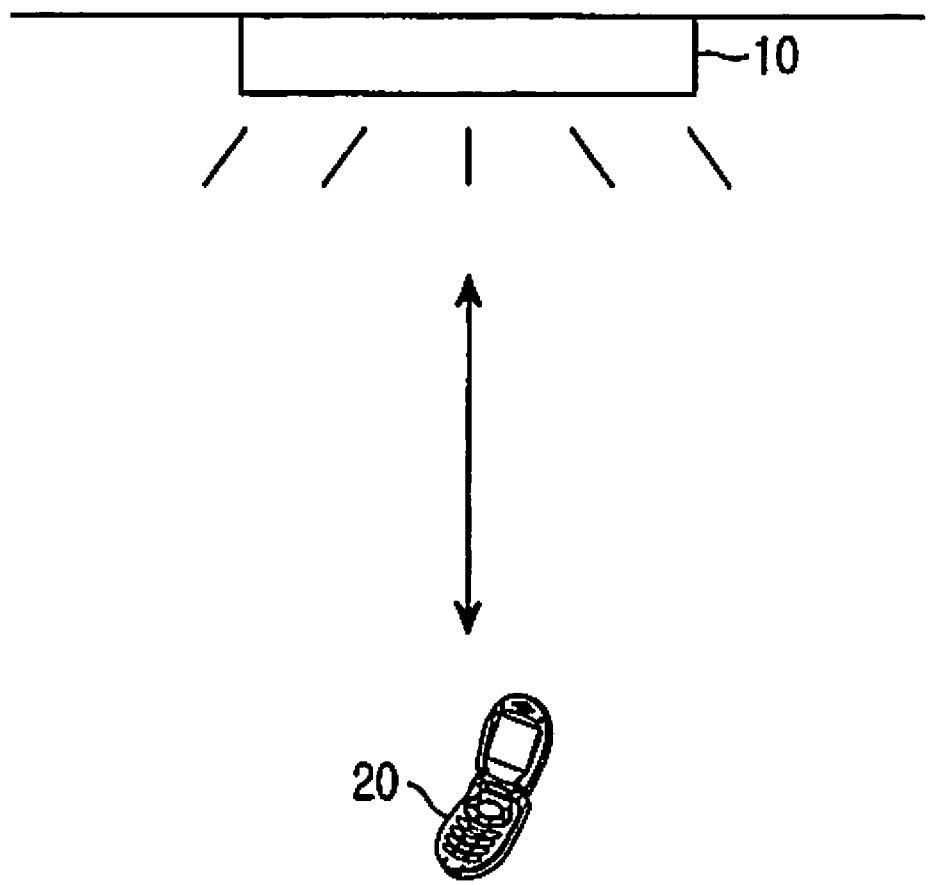
FIG. 1 is a diagram illustrating a configuration of a conventional VLC system.

Preferred embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but, are merely used by the inventor to enable a clear and consistent understanding of the invention. Accordingly, it should be apparent to those skilled in the art that the following description of preferred embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An embodiment of the present invention provides a VLC system that transmits data using Time Division Multiplexing (TDM). The VLC system transmits data in specified time slots in a time division manner, thereby multiplexing one light source, or one cell, to a plurality of channels. Accordingly, the VLC system allocates time slots to each VLC user, or each user service/content, independently, thereby efficiently and diversely transmitting data through a plurality of channels. Further, an embodiment of the present invention forms cells that each include at least one light source, and provides user services on a cell-by-cell basis. All light sources included in one cell provide the same types of user services, and the number of user services provided in one cell can be greater than or equal to 1. In an embodiment of the present invention, the user services, which carry certain data to VLC terminals, can be classified according to service users, types of transmission contents, or data transmission schemes such as broadcasting, multicasting, etc. All light sources included in one cell transmit the same data using specific downlink time slots. Accordingly, even different light sources, if they are included in the same cell, can transmit the same data. Thus, data transmission is possible without data collision even though the light sources may have an overlapping service area. In accordance with an embodiment of the present invention, the allocation of time slots may be dynamically changed according to characteristics of user services and/or communication environments while the same user services are being performed. Similarly, the light sources included in one cell and the number of the light sources may also be dynamically changed according to characteristics of user services and/or communication environments while the same user services are performed. The light sources belonging to one cell may be physically adjacent or not adjacent. In an embodiment of the present invention, cells are unfixed, and they are formed not by physical locations of the light sources, but by logical mapping to the light sources.

Figure 5:
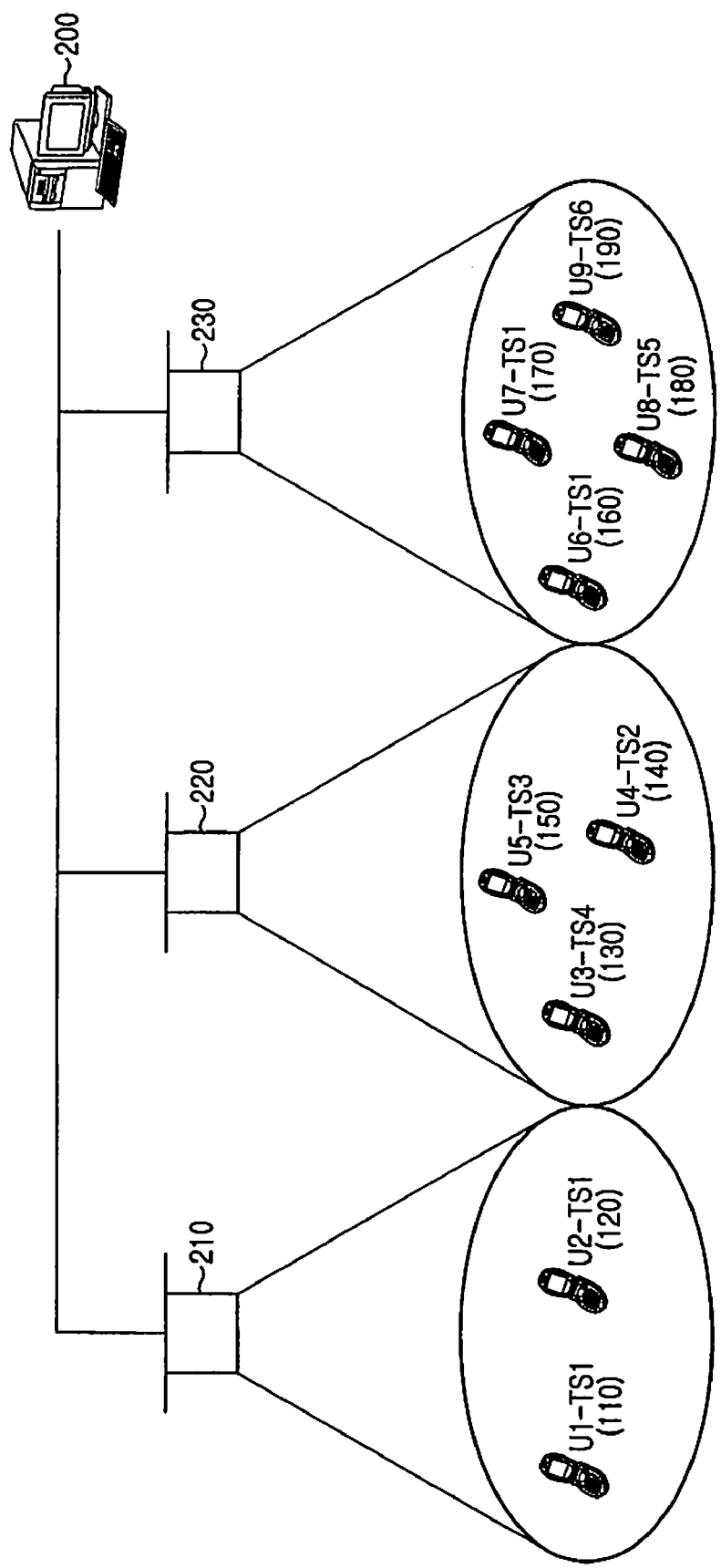
FIG. 5 is a diagram illustrating a configuration of a VLC system according to an embodiment of the present invention.

FIG. 5 is a diagram illustrating a configuration of a VLC system according to an embodiment of the present invention. As illustrated in FIG. 5, the VLC system includes one or more VLC terminals 110, 120, 130, 140, 150, 160, 170, 180 and 190, one or more light sources 210, 220 and 230, and a communication control device 200.

Figure 2:
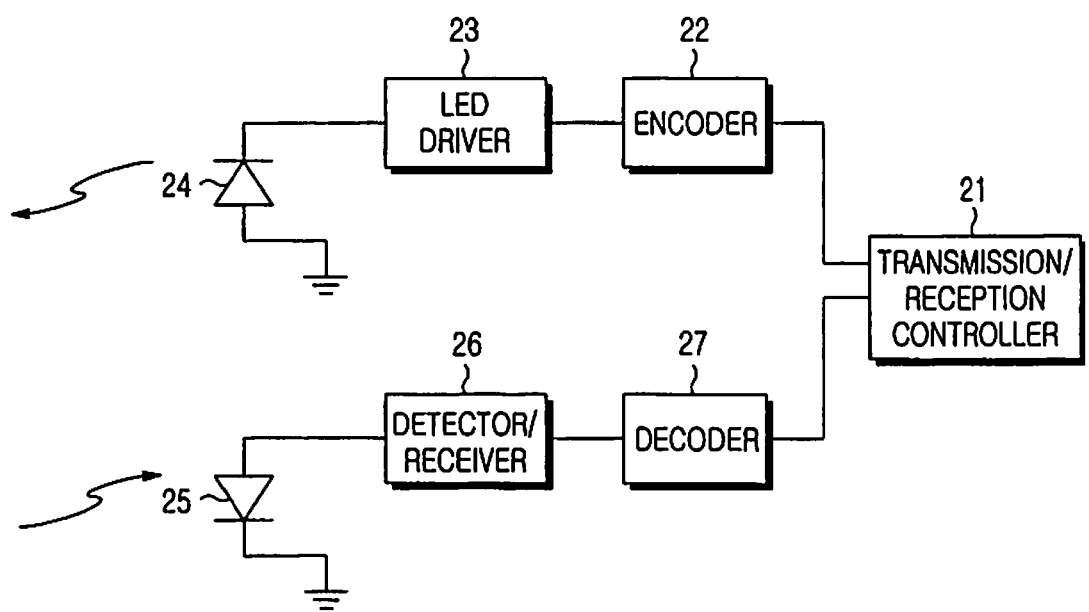
FIG. 2 is a diagram illustrating a structure of a general VLC terminal.
Figure 3:
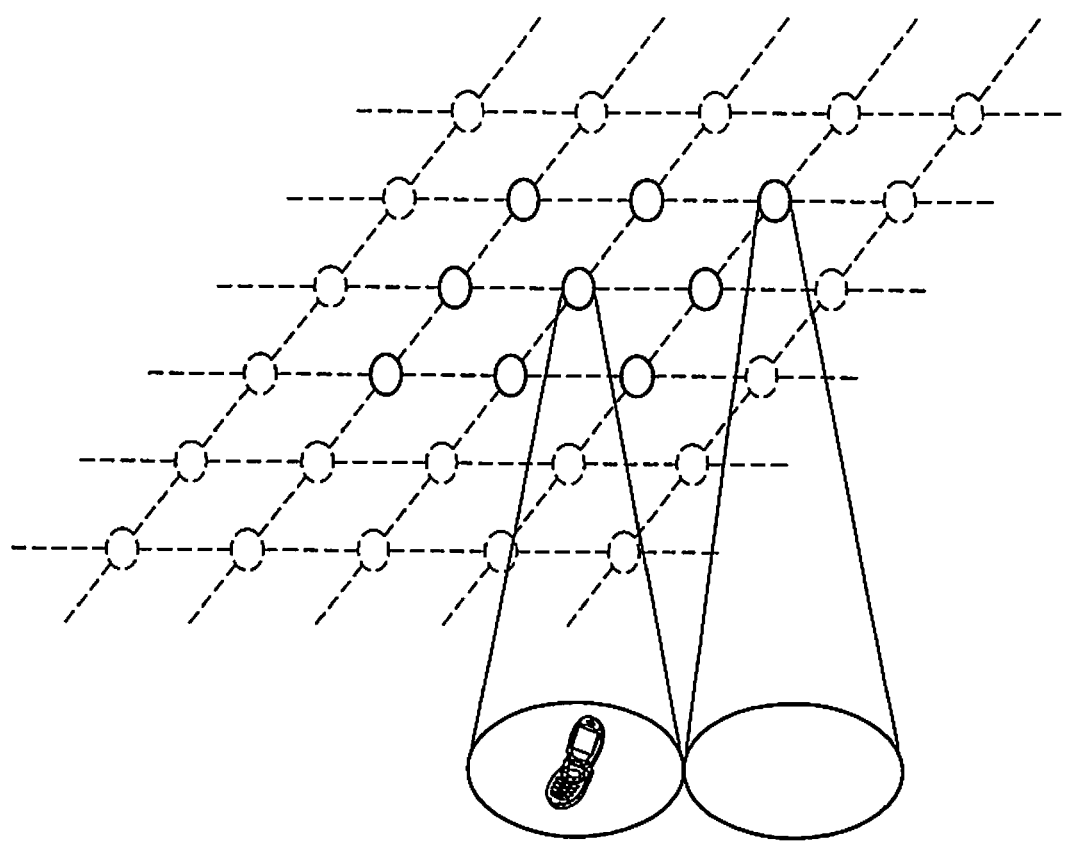
FIG. 3 is a diagram illustrating a plurality of light sources provided on a plane.
Figure 4A:
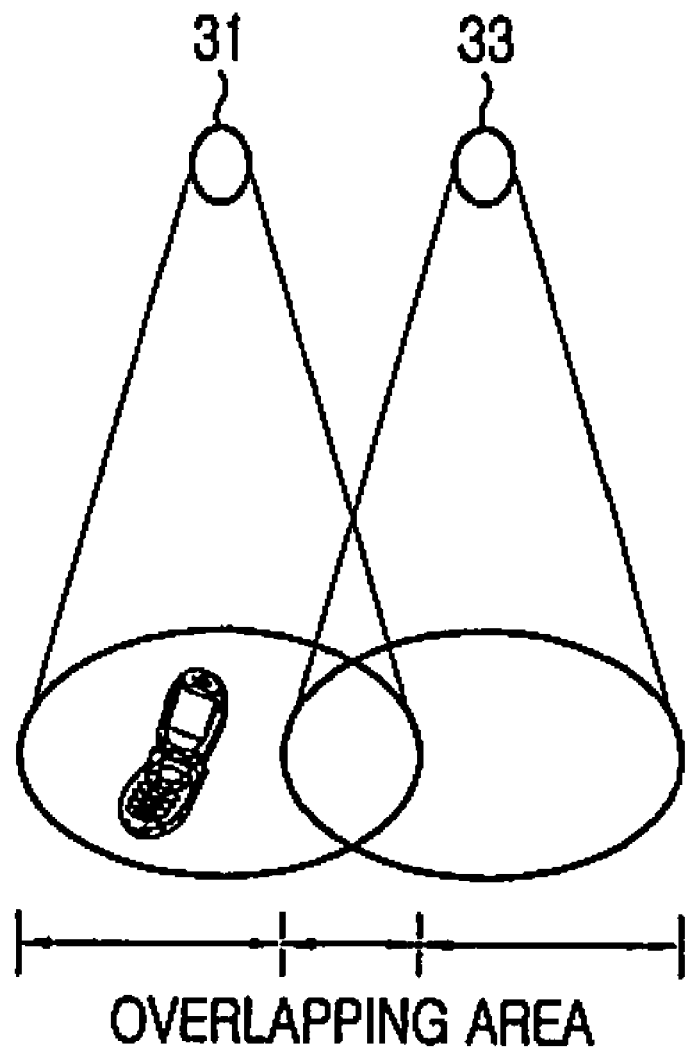
FIGS. 4A to 4C are diagrams illustrating possible service areas of two light sources.
Figure 4B:
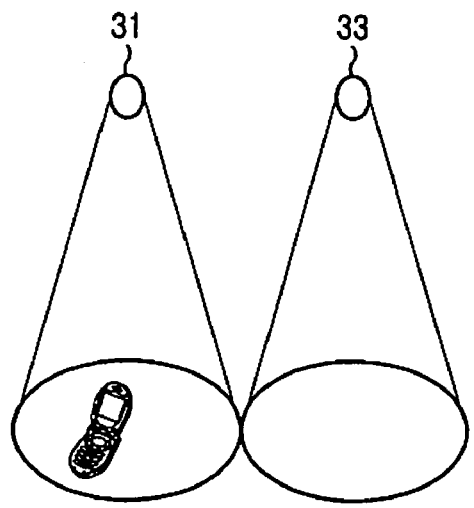
Figure 4C:
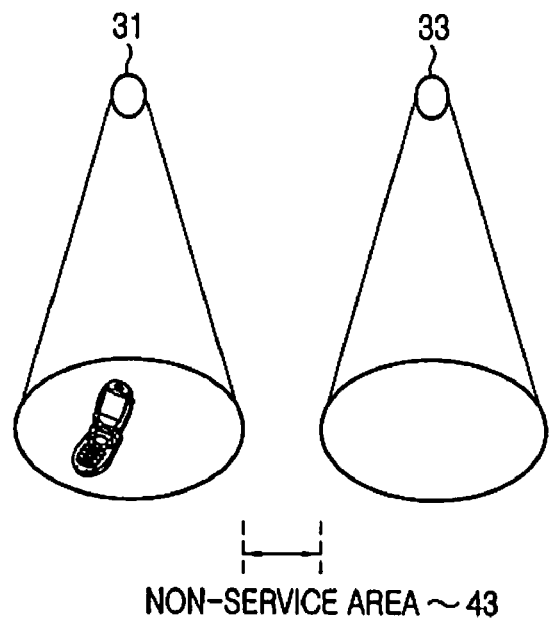

Each of the VLC terminals 110, 120, 130, 140, 150, 160, 170, 180 and 190 has a similar structure as the VLC terminal 10 illustrated in FIG. 2, and transmits/receives VLC data using the same time slots as the uplink and downlink time slots allocated thereto by the communication control device 200.

The light sources 210, 220 and 230 each have a light source ID, which is an identifier allocated uniquely thereto, and transmit transmission data received from the communication control device 200 to the VLC terminals 110, 120, 130, 140, 150, 160, 170, 180 and 190 located in their service areas. Further, the light sources 210, 220 and 230 transmit the data received from each of the VLC terminals 110, 120, 130, 140, 150, 160, 170, 180 and 190 to the communication control device 200. In addition, the light sources 210, 220 and 230 periodically broadcast a frame synchronization signal so that VLC terminals located in a service area of each light source can be synchronized with each other. The light sources 210, 220 and 230 may serve as an access point(s) on a cell-by-cell basis. For example, when one light source is mapped to one cell, the one light source functions as an access point, and when multiple light sources are mapped to one cell, the multiple light sources serve as one access point.

The communication control device 200 manages light source IDs of all light sources connected thereto, forms cells including specific light sources according to user services it will provide in the specific light sources, and allocates time slots, such as uplink/downlink time slots, depending on user service/data to be provided in each cell, and users located in each cell.

In an embodiment of the present invention, since the cells are determined according to user services to be provided by the light sources, and not geographic locations of the light sources, their sizes, locations or shapes are unfixed. The number of light sources included in one cell is also unfixed, and light sources may exist that do not belong to a cell. However, in all cases, one cell must include at least one light source. New cells are formed, sizes and shapes of the already formed cells are changed, and the cell forming is cancelled according to user services or contents to be delivered. These operations are accomplished by a light source grouping process.

Figure 6:
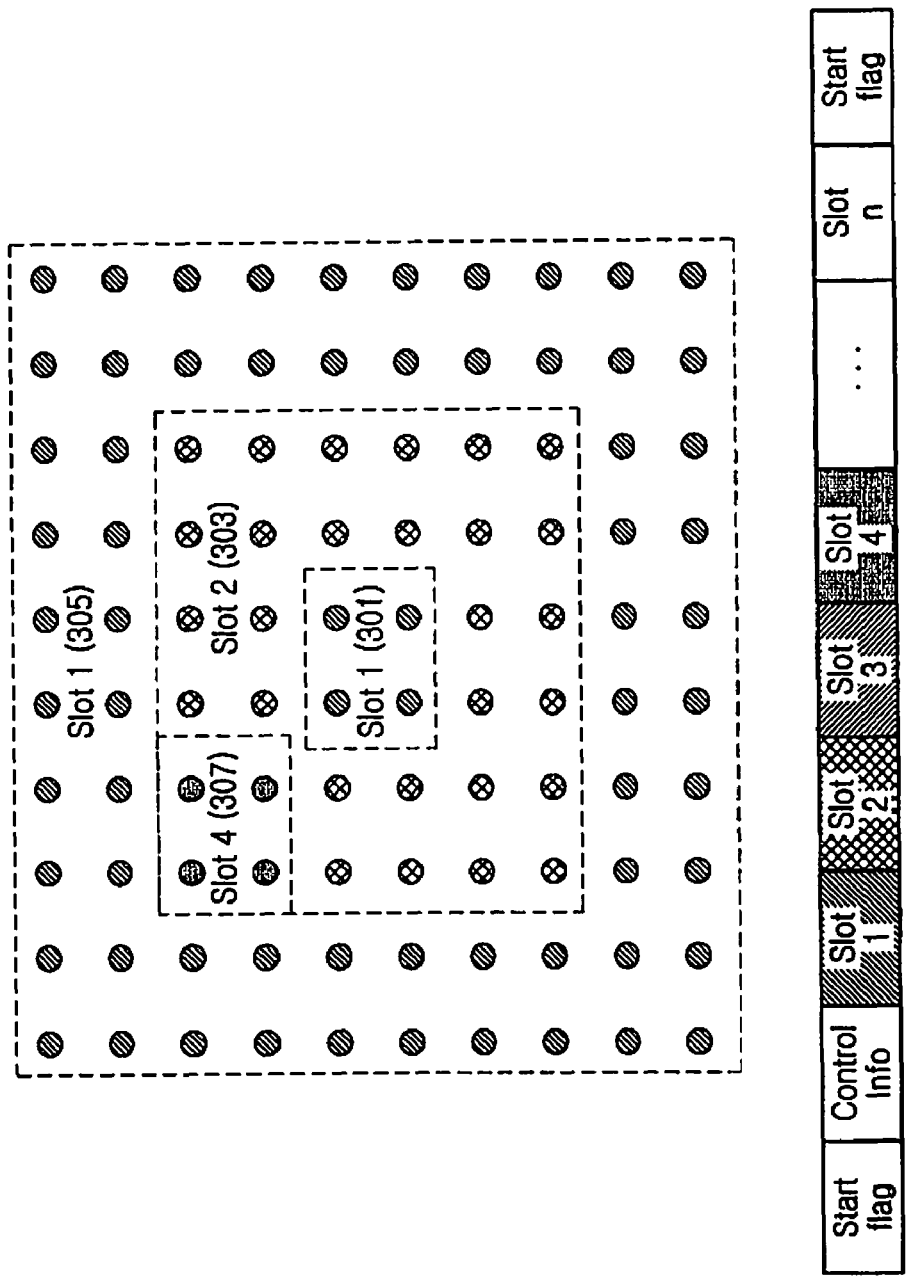
FIG. 6 is a diagram illustrating possible cell shapes according to an embodiment of the present invention.

Shapes of the cells according to an embodiment of the present invention are illustrated in FIG. 6. The cells, as illustrated in FIG. 6, can be formed in rectangular shapes 301 and 307, a rectangular picture-frame shape 305, and a polygonal shape 303.

All light sources included in one cell provide the same types of user services, and the number of user services provided in one cell can be greater than or equal to one. The user services can be classified according to the type of content to be delivered, data transmission schemes such as broadcasting, multicasting, etc., or users that will receive the services. A plurality of time slots can be allocated to one cell, and all light sources included in one cell transmit data of the same content using specific downlink time slots.

Accordingly, the communication control device 200 stores and manages user information, light source IDs, cell pattern information, and the like. The user information, information indicating characteristics of VLC users, may include user IDs used to identify users, VLC terminals registered for users and terminal IDs allocated to the VLC terminals, user services set for users, user preferences, etc. The cell pattern information, information indicating the currently formed cells and an allocation status of time slots, may include information about (i) light sources included in each of the presently formed cells, (ii) light sources not included in the cells, (iii) types of user service/data provided in each cell, (iv) types of user services/contents provided in each cell and time slots allocated to users located in each cell, and (v) presently unused time slots.

The communication control device 200 groups light sources, maps the grouped light sources to cells, and allocates proper time slots thereto, depending on the user information and the cell pattern information. The communication control device 200 does not allocate the same time slots to the cells that are physically and geographically adjacent to one another. All the time slots allocated to adjacent cells should be different from one another. When adjacent cells use the same time slots, different data may be transmitted over the same time slots in the overlapping area where service areas of light sources located in the areas of the adjacent cells overlap each other, causing data collision and thus disabling normal VLC communication. However, the communication control device 200 can allocate the same time slots used for transmitting different content, to the non-adjacent cells. Accordingly, each of the cells can transmit different content using associated time slots. One cell can be allocated a plurality of time slots according to types of user services/content provided in the cell, and users located in service areas of the cell. Similarly, user services, users, and transmission content may also be allocated a plurality of time slots. The communication control device 200 may allocate new time slots to specific cells, when it should provide new data or when it should provide user services other than the user services that are presently provided in the specific cells.

For example, when an advertisement user service is provided that broadcasts advertisement data to a plurality of unspecified persons, the communication control device 200 maps light sources located in the space where the advertisement user service is to be provided, to one cell A, and allocates, to the mapped cell A, a time slot A it will use to broadcast advertisement data. The time slot A should be a time slot that is unused in a cell B that is adjacent to the mapped cell A. A notification of the allocated time slot A is provided to each VLC terminal located in service areas of the cell A, and then advertisement data is broadcast using the allocated time slot A. When a specific VLC terminal located in the service area of the cell A requests detailed advertisement information, the communication control device 200 allocates a time slot B to the cell A and the specific VLC terminal, and transmits the detailed advertisement information using the time slot B.

Through this process, the VLC system can improve its system capacity in terms of accommodation of cell users.

Another example is provided with reference to FIG. 5, in which a first light source 210, a second light source 220, and a third light source 230 form independent cells, respectively. A first cell, in which the first light source 210 is included, is broadcasting data using a first time slot TS1, and then a first VLC terminal 110 and a second VLC terminal 120 receive data using the first time slot TS1. In this example, a second cell, in which the second light source 220 is included, provides individual user services that transmit different data to associated users using a plurality of time slots. For that purpose, a second time slot TS2 is allocated to a fourth user 140, a third time slot TS3 is allocated to a fifth user 150, and a fourth time slot TS4 is allocated to a third user 130 so that associated data services are provided to the users. A third cell, in which the third light source 230 is included, is an example of a cell that provides a combined user service of multicasting and individual data transmission. In this example, a multicasting service is provided to a sixth VLC terminal 160 and a seventh VLC terminal 170 through the first time slot TS1. Further, a fifth time slot TS5 and a sixth time slot TS6 are allocated to an eighth VLC terminal 180 and a ninth VLC terminal 190, respectively, to provide different data. Though the first time slot ST1 is used even in the first cell, since the first cell and the third cell are not adjacent to each other, VLC communication can be normally performed in both cells.

When the communication control device 200 needs to provide services in an area broader than the service area of the presently formed specific cell, or needs to narrow the space where services are provided, the communication control device 200 may additionally map the light sources near the current cell, to the current cell, or exclude some light sources included in the current cell from the current cell. That is, the light sources included in the cell can be dynamically changed, so that the cell has a dynamic configuration.

For example, when a tenth VLC terminal (not shown) that should receive a multicasting service provided in the third cell through the first time slot is newly located in a service area of a fourth light source (not shown) that is adjacent to but not included in the third cell, the communication control device 200 additionally maps the fourth light source to the third cell, and provides the multicasting service to the tenth VLC terminal using the first time slot. The tenth VLC terminal located in the service area of the fourth light source can be detected with an Acknowledgement (ACK) from the tenth VLC terminal and a terminal ID of the tenth VLC terminal, both of which are transmitted in accordance with a frame synchronization signal that is periodically broadcast from each light source. When the light source receives the ACK together with the terminal ID of the VLC terminal and then transmits them to the communication control device 200, the communication control device 200 cannot determine from which light source the ACK was transmitted.

The mapping of new cells, the change in old cells, the allocation of new time slots to the old cells, etc. may be performed not only when user services or transmission contents to be provided in the corresponding cells are changed, but also when new users are located in service areas of the corresponding cells.

Notification of the allocated time slots are provided to user services to which time slots were allocated, or VLC terminals that will be provided with services, i.e. will receive data. Therefore, the frame may include light source IDs (Access Point IDs) of light sources that transmit data using the time slots, the total number of time slots, IDs of the time slots, and IDs of the VLC terminals that will receive data.

Figure 7:
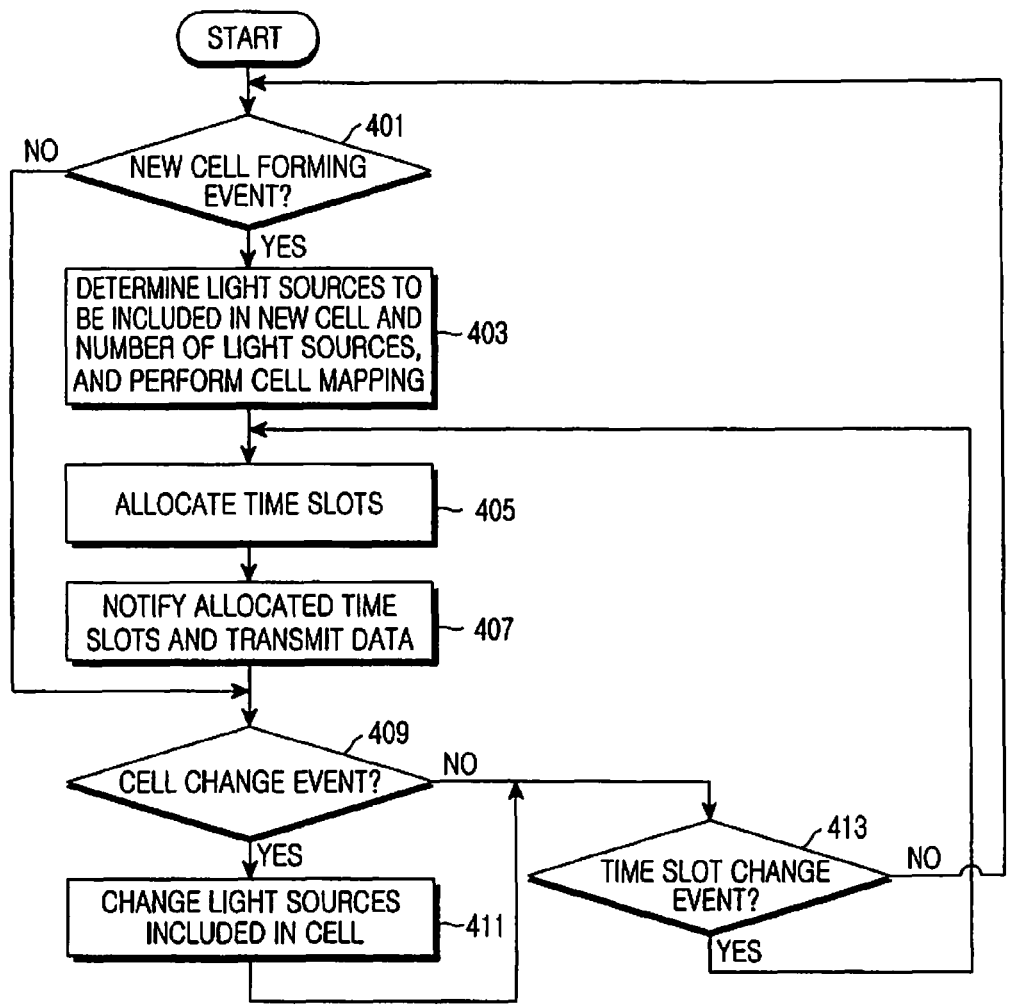
FIG. 7 is a flow diagram illustrating a process of forming a cell and allocating time slots according to an embodiment of the present invention.

FIG. 7 is a flow diagram illustrating a process of forming and changing a cell(s) by a communication control device 200 according to an embodiment of the present invention. Referring to FIG. 7, if a new cell forming event occurs in step 401, the communication control device 200 determines light sources to be included in a new cell and the number of the light sources, and maps them to the cell in step 403. The cell forming event is an event that requires forming of a new cell in addition to the already existing cells, and this event may occur at the user's request or by the need for a new user service. For example, this event may occur when a new user service is to be provided that is not provided by adjacent light sources or the existing cells, and a new VLC terminal is located in a service area of a light source from which no user service is provided. The communication control device 200 determines light sources to be included in a new cell and the number of the light sources, and groups them for cell mapping according to characteristics of user services/contents to be provided, preferred locations of users that will receive the user services, or the like. In another embodiment of the present invention, a basic cell may be predefined. The basic cell includes information on the number of light sources to be included in a cell when a new cell is first formed, information on a shape of the cell, etc. Various basic cells are available according to the number of light sources included therein, shapes of the cells, or the like. Therefore, slightly static mapping is also possible.

Thereafter, in step 405, the communication control device 200 allocates proper time slots taking the current time slot allocation status into consideration. The time slot allocation is also determined according to characteristics of user services/content, and/or users that will be provided with the user services, and the determination is made taking into account the time slots used in adjacent cells. After completion of the time slot allocation, the communication control device 200 provides a notification of the allocated time slots to a corresponding VLC terminal(s) using a downlink, and transmits data using the allocated time slots in step 407.

In step 409, the communication control device 200 determines whether a cell change event occurs. If a cell change event occurs, the communication control device 200 changes light sources included in the cell in step 411. The cell change event is an event for requesting a change in construction of the current cell. This event may occur, for example, when there are no more VLC terminals located in service areas of some light sources among the light sources included in a specific cell, or when some light sources need to be excluded from the specific cell because user services in the light sources have been completed. Also, the cell change event may occur when another light source needs to be added in a specific cell, because a VLC terminal of a user associated with a user service provided in the specific cell exists in another light source which is not included in the specific cell. Thereafter, in step 413, the communication control device 200 determines whether a time slot change event occurs. The time slot change event, or an event for requesting a change in time slots allocated to the current cell, may occur depending on occurrence/termination of user services, a change in communication environments, occurrence of cell change event, etc. When the time slot change event occurs, the communication control device 200 proceeds to step 405 and repeatedly performs the above process. When the time slot change event does not occur, the communication control device 200 proceeds to step 401 and repeatedly performs the above process.

Meanwhile, due to the mobility of VLC, a VLC terminal can enter a service area of a light source that is in a service area other than the service area of a light source to which it now belongs, i.e. a service area of a service source light source, even while performing a user service. If the other light source is a light source that is not mapped to a cell to which the service source light source is mapped, the VLC terminal may not continuously receive the user service. Therefore, a cell change event should occur due to the mobility of the VLC terminal, and reallocation of time slots may happen. The term "service source light source" as used herein refers to a light source that provides a user service to a VLC terminal, and it is a light source corresponding to a service area where the VLC terminal is presently located.

Accordingly, the communication control device 200 tracks a location of the VLC terminal that is receiving data, on a real-time basis, maps the cell again according to the current location of the VLC terminal, and reallocates time slots if needed. Because the cell mapping should enable the user service that is provided to normally operate in all of the existing cells, not only the types of but also the number of the existing light sources constituting each cell may change according to the current locations of all the VLC terminals. Since adjacent cells may also change due to a change in the cell configuration, reallocation of time slots may also be performed. The reallocation of time slots can be simultaneously achieved not only in the cell that undergoes remapping, but also in its adjacent cells.

Figure 8:
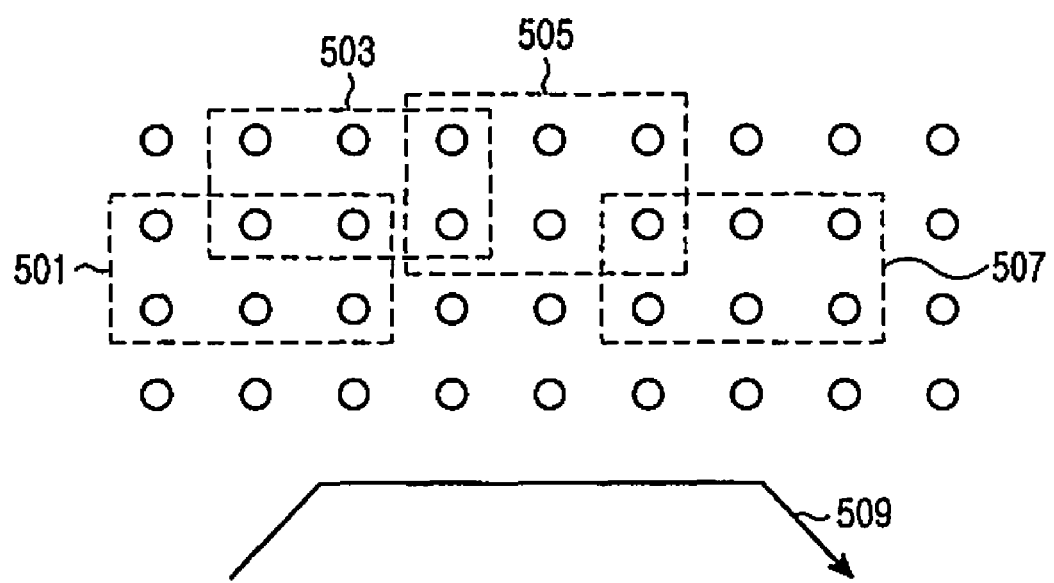
FIG. 8 is a diagram illustrating a moving path of a cell according to an embodiment of the present invention.

An example is illustrated in FIG. 8, in which mapping of a cell is changed along a moving path of a VLC terminal according to an embodiment of the present invention. In the example of FIG. 8, in accordance with a moving path 509 of a VLC terminal, a fourth cell first moves from a location 501 to a location 503 in the one-o'clock direction, then moves to a location 505 in the three-o'clock direction, and thereafter moves to a location 507 in the four-o'clock direction.

There are several possible methods for detecting a location of a VLC terminal. In an embodiment of the present invention, a communication control device 200 may detect a location of a VLC terminal by detecting a light source corresponding to a service area to which the VLC terminal presently belongs. The location detection is possible by performing an operation in which a VLC terminal transmits an ACK in response to data received from a light source in a service area where it is presently located, and the light source that received the ACK forwards it to the communication control device 200. The communication control device 200 can determine which light source has forwarded the ACK, and detect the current location and moving state of each VLC terminal by extracting VLC terminal IDs included in the received ACK on a real-time basis.

There are several possible methods for adding new light sources in a cell or excluding the light sources already included in the cell depending on the current location and moving state of VLC terminals, in accordance with an embodiment of the present invention. In accordance with an embodiment of the present invention, when a specific VLC terminal enters a service area of a light source being adjacent to a light source which is not included in its own cell, the communication control device 200 performs cell remapping on all light sources being adjacent to the light source that the VLC terminal has entered, determining that location as an effective location of the specific VLC terminal.

Figure 9:
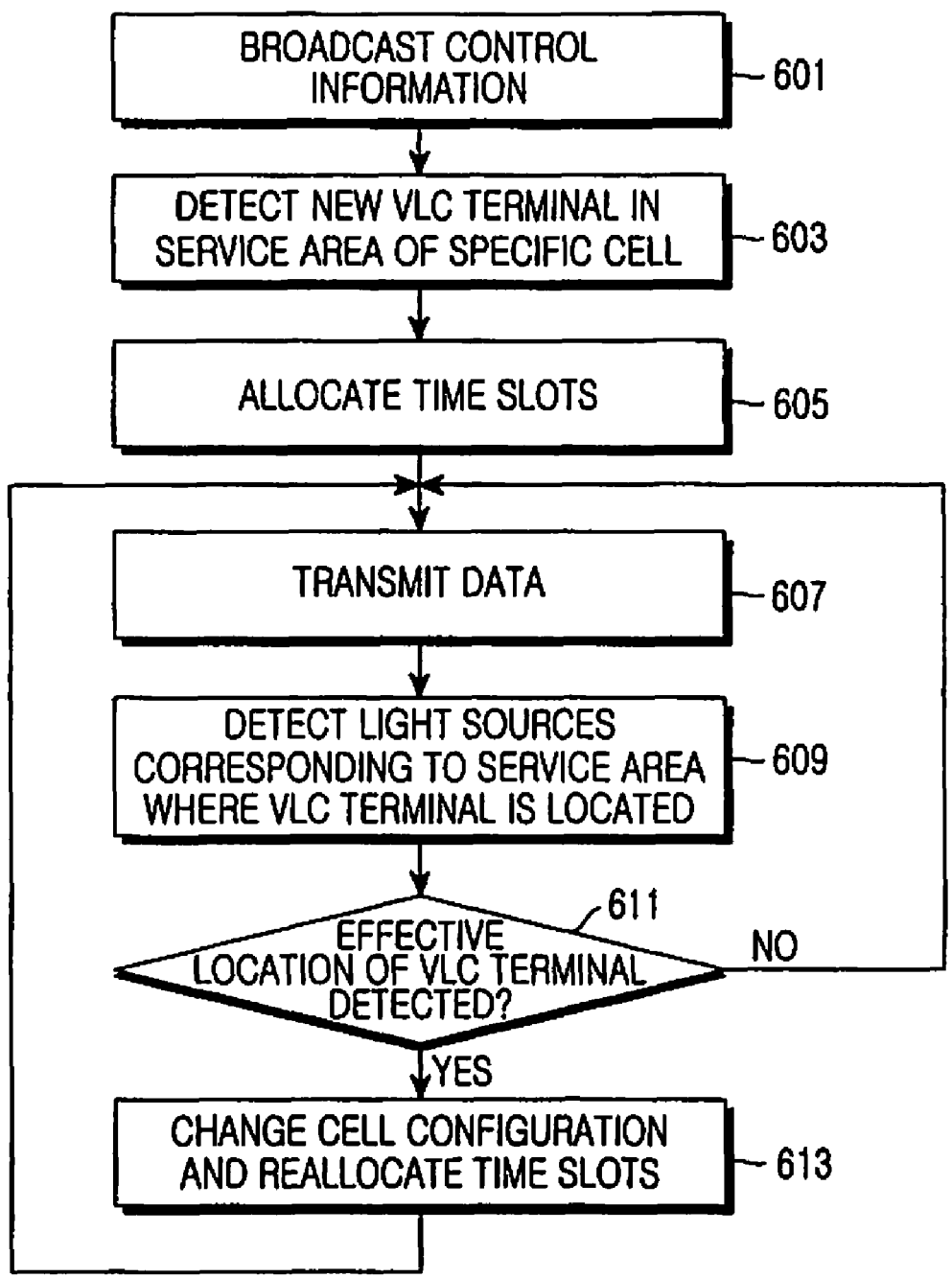
FIG. 9 is a flow diagram illustrating an operation of a communication control device according to an embodiment of the present invention.

With reference to FIG. 9, a description is provided of an operation of the communication control device 200 performed when a cell change event occurs according to the effective location of the VLC terminal. FIG. 9 is a flow diagram illustrating a process of changing an adjacent cell upon detecting an effective location.

Referring to FIG. 9, a communication control device 200 periodically broadcasts a frame synchronization signal through a downlink in step 601. When the communication control device 200 detects a new VLC terminal in a service area of a specific cell in step 603, the communication control device 200 allocates a proper time slot to the VLC terminal in step 605, and transmits data using the time slot in step 607.

Figure 10:
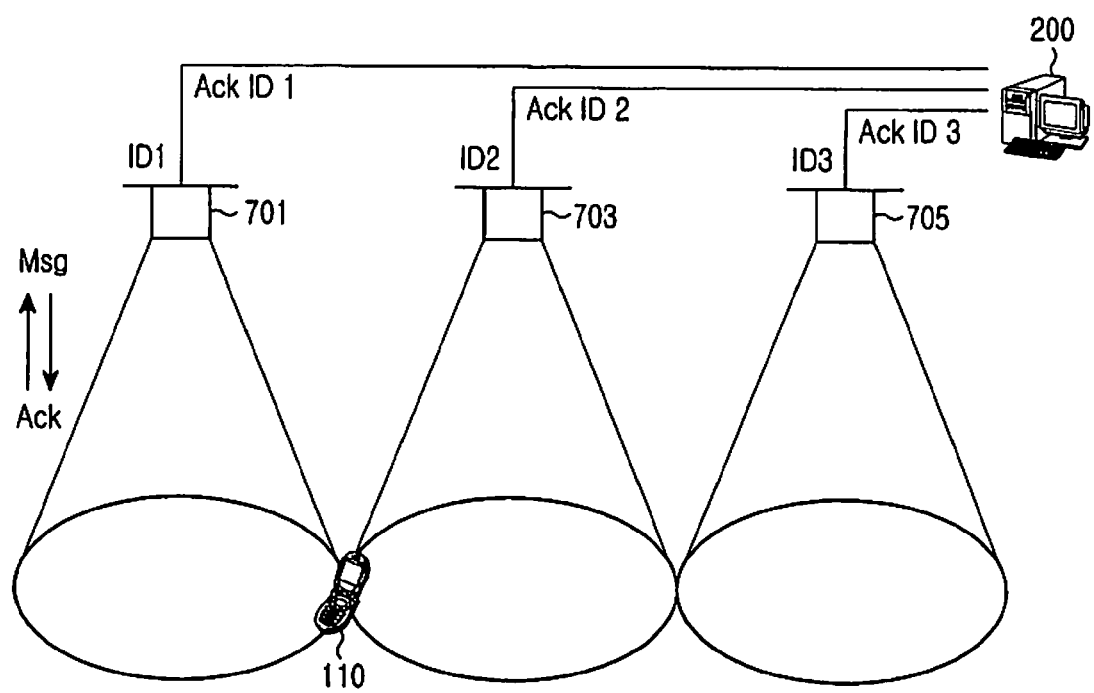
FIG. 10 is a diagram illustrating a method for sensing motion of a VLC terminal according to an embodiment of the present invention.

Referring to FIG. 10, when a first VLC terminal 110 receives downlink data message (Msg) after acquiring synchronization through a downlink of an eleventh light source 701, the first VLC terminal 110 transmits an uplink ACK indicating receipt/non-receipt of the data to the eleventh light source 701.

The eleventh light source 701 delivers the received ACK to the communication control device 200, and based thereon, the communication control device 200 determines that the first VLC terminal 110 is located in a service area of the eleventh light source 701, as shown in step 609 of FIG. 9. Here, the eleventh light source 701 and a twelfth light source 703 being adjacent to the eleventh light source 701 are assumed to be mapped to the same cell, and the eleventh light source 701 and a thirteenth light source 705 being adjacent to the twelfth light source 703 are assumed to be mapped to different cells. Accordingly, the eleventh light source 701 and the twelfth light source 703 provide the same user service using the same time slot. Therefore, even though the first VLC terminal 110 enters a service area of the twelfth light source 703, the first VLC terminal 110 can continuously receive the user service. The twelfth light source 703 receives an ACK indicating receipt of the downlink message Msg at the first VLC terminal 110 and forwards it to the communication control device 200. Thus, the communication control device 200 determines that the location of the first VLC terminal 110 corresponds to a service area of the twelfth light source 703.

However, because the thirteenth light source 705 is not mapped to the same cell, the user service being provided to the first VLC terminal 110 may be interrupted if the first VLC terminal 110 moves and enters the service area of the thirteenth light source 705. Therefore, in an embodiment of the present invention, a location of a VLC terminal is determined as an effective location, when the VLC terminal enters a service area of a light source being adjacent to the light source which is not included in its own cell, as shown in step 611 of FIG. 9. In addition, among the light sources being adjacent to the light source in the service area to which the VLC terminal belongs, all light sources which are not mapped to its own cell are mapped to the corresponding cell. Referring to FIG. 10, when the communication control device 200 determines that the first VLC terminal 110 is located in the service area of the twelfth light source 703, the communication control device 200 detects this location as an effective location of the first VLC terminal 110. Further, the communication control device 200 maps the thirteenth light source 705 to the same cell so that the twelfth light source 703 and the thirteenth light source 705 may provide the same user service. As a result, the VLC terminal may provide seamless services even while on the move. Through this process, the communication control device 200 performs continuous cell changing/mapping and reallocates time slots, thereby maintaining data transmission, as shown in step 613 of FIG. 9.

The communication control device 200 should rapidly detect the effective location so that the user service being provided to a specific VLC terminal may be accomplished smoothly. Accordingly, a cell light source matrix and an adjacent light source matrix are used in embodiments of the present invention. The cell light source matrix and the adjacent light source matrix exist for each cell. The cell light source matrix is a matrix consisting of light source IDs of light sources included in the corresponding cell, and the adjacent light source matrix is a matrix consisting of light source IDs of the remaining light sources except for the light sources included in the corresponding cell among the light sources being adjacent to each light source in the corresponding cell. The cell light source matrix and the adjacent light source matrix are updated in real-time every time cell mapping is performed. When plural light sources are arranged regularly, the cell light source matrix and the adjacent light source matrix can be updated more easily and rapidly.

Figures 11, 12:
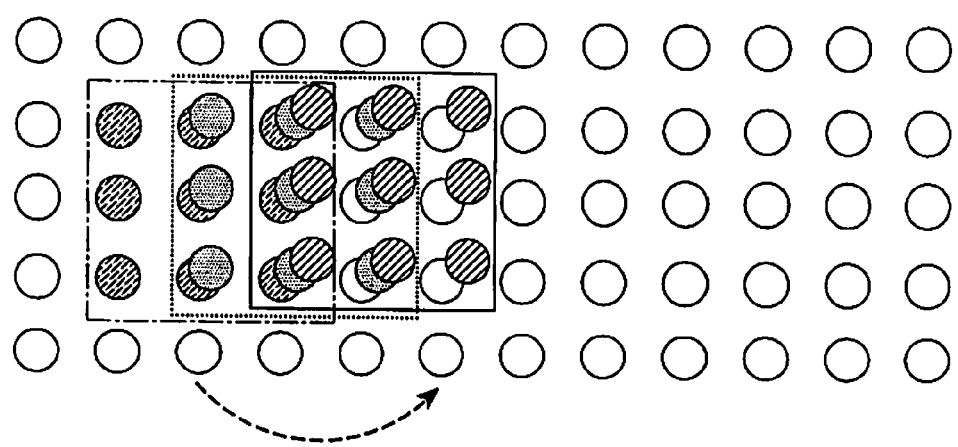
FIG. 11 is a diagram illustrating arrangement of light sources according to an embodiment of the present invention.
FIG. 12 is a diagram illustrating a change in cell construction according to an embodiment of the present invention.

The cell light source matrix and the adjacent light source matrix will be described with reference to FIG. 11. FIG. 11 is a diagram illustrating an example where a plurality of light sources are arranged in a lattice and a light source ID of each light source is expressed in matrix coordinates according to an embodiment of the present invention. In the case of FIG. 11 where light sources are arranged in a lattice and the number of light sources mapped to one cell is 4, a cell light source matrix can be expressed as Equation (1) and its adjacent light source matrix can be expressed as Equation (2).

$$\begin{pmatrix} (n, m) & (n+1, m) \\ (n, m+1) & (n+1, m+1) \end{pmatrix} \quad (1)$$

$$\begin{pmatrix} (n-1, m+1)(n-1, m)(n-1, m-1)(n, m-1)(n+1, m-1) \\ (n+2, m+1)(n+2, m)(n+2, m-1)(n+1, m-1)(n, m-1) \\ (n+1, m+2)(n, m+2)(n-1, m+2)(n-1, m+1)(n-1, m) \\ (n+2, m)(n+2, m+1)(n+2, m+2)(n+1, m+2)(n, m+2) \end{pmatrix} \quad (2)$$

Assuming that n=3 and m=3, Equation (1) indicates a cell light source matrix for a seventh cell 800 in FIG. 11, and light source IDs included in a cell light source matrix based on Equation (1) include (3,3), (4,3), (3,4) and (4,4).

If a VLC terminal is located in a service area of a light source (3,3), adjacent light sources to which the VLC terminal can move include a light source (2,4), a light source (2,3), a light source (2,2), a light source (3,2), a light source (4,2), a light source (4,3), a light source (4,4), and a light source (3,4). Because these adjacent light sources are the nearest light sources among the light sources near the VLC terminal, the VLC terminal will pass through one of them first regardless of the direction it moves. Therefore, when mobility of the VLC terminal is taken into consideration, if adjacent light sources are determined in advance that are just next to the light source corresponding to the service area where the VLC terminal is currently located, it is possible to reduce the time required for predicting and detecting mobility of the VLC terminal, and performing its operations according thereto.

Because the light source (4,3), the light source (4,4) and the light source (3,4) among the adjacent light sources are mapped to the same cell as the light source (3,3), i.e. to the seventh cell 800, they provide the same service as the light source (3,3), and the VLC terminal can continuously receive the same data even through it moves to the corresponding service area. Therefore, among the adjacent light sources, the light sources to which attention should be paid with regard to mobility of the VLC terminal include the light source (2,4), the light source (2,3), the light source (2,2), the light source (3,2) and the light source (4,2), and these light sources are included in the adjacent light source matrix. It is preferable that the light sources included in the adjacent light source matrix are additionally mapped to the existing cell when mobility of the VLC terminal is taken into account.

Accordingly, after the communication control device 200 updates and stores the cell light source matrix and the adjacent light source matrix on a real-time basis, it detects adjacent light sources for the light source corresponding to the service area where the VLC terminal is located, using the adjacent light source matrix. Further, the communication control device 200 performs cell mapping such that the detected adjacent light sources are added to the cell, and updates the cell light source matrix and the adjacent light source matrix according to the cell mapping.

The communication control device 200 may exclude some light sources mapped to the cell in an attempt to efficiently use wireless communication resources. For example, in FIG. 11, with the seventh cell 800 including the light source (3,3), light source (4,3), light source (3,4), light source (4,4), light source (5,3) and light source (5,4), if the VLC terminal is located in the service area of the light source (3,3), then the light source (2,4), light source (2,3), light source (2,2), light source (3,2), and light source (4,2) are additionally mapped to the seventh cell 800. On the contrary, the light source (5,3) and light source (5,4) are excluded from the seventh cell 800. This is because the light source (5,3) and light source (5,4) are relatively free from mobility of the VLC terminal as they do not directly neighbor the current light source (3,3). However, no VLC terminal that will receive user services provided in the seventh cell 800 must exist in the service areas of the light source (5,3) and light source (5,4). A process of changing cells based on the addition and deletion of light sources is illustrated in FIG. 12.

Meanwhile, for simplicity, the light source IDs may be expressed with sequence numbers. That is, the light source IDs can be assigned sequence numbers such that (1,1)=1, (2,1)=2, (3,1)=3, (4,1)=4, (5,1)=5, (6,1)=6, (1,2)=7, (2,2)=8, (3,2)=9, and (4,2)=10, and they can be expressed in binary, decimal or hexadecimal. For example, a light source ID of 10 is expressed as '0001 0000' in binary, and the expressed 8-bit value can be used as a light source ID.

In the foregoing example, the cell mapping is performed such that when a VLC terminal is located in a service area of a specific light source, all adjacent cells neighboring the specific light source are included in the relevant cell. However, the cell mapping may be performed such that only some of the adjacent cells are included in the cell. For example, the light sources to be added to the cell may be selected from the adjacent light sources taking into account a moving pattern of the VLC terminal. If the VLC terminal is characterized by moving only in a predetermined direction, the light sources to be added may be selected taking only the corresponding direction into account. As another example, if a moving velocity of the VLC terminal is higher than or equal to a specific velocity, a range of the light sources to be added may be extended to an area broader than the region of the adjacent light sources. In addition, the cell change may not be made despite movement of the VLC terminal, according to communication environments and types of user services.

It is characterized in embodiments of the present invention that a cell consists of one or more light sources. Accordingly, a configuration mode of a cell can be classified into a single source mode consisting of one light source, and a granular source mode consisting of two or more light sources. The cell configuration mode is determined according to characteristics of user services provided in the corresponding cell, or several communication environments.

In the granular source mode, when a VLC terminal enters a service area of another adjacent light source from a service area of a service source light source, since the adjacent light sources are providing user services in the same environment, the VLC terminal can receive continuous data without a separate synchronization or link setup process, i.e. a cell initialization process, and no cell change occurs.

However, in the single source mode where the cell has one light source mapped thereto, if a VLC terminal moves and leaves a service area of the current source service light source, the VLC terminal leaves the service area of the cell and enters a service area of another cell, or enters a service area of a light source for which no cell is formed. Accordingly, the VLC terminal should perform a synchronization procedure to establish a new communication link.

Thus, if information about the service source light source or information about a configuration mode of the cell mapped to the service source light source are provided to the VLC terminal, the cell initialization process can be efficiently performed. Accordingly, in an embodiment of the present invention, an uplink/downlink frame includes, as control information, cell configuration information indicating a configuration mode of a cell to which each of the VLC terminals presently belongs, a light source ID of a service source light source for each VLC terminal, and a cell inclusion status for adjacent cells of each service source light source. This embodiment of the present invention is illustrated in FIG. 13.

Figure 13:
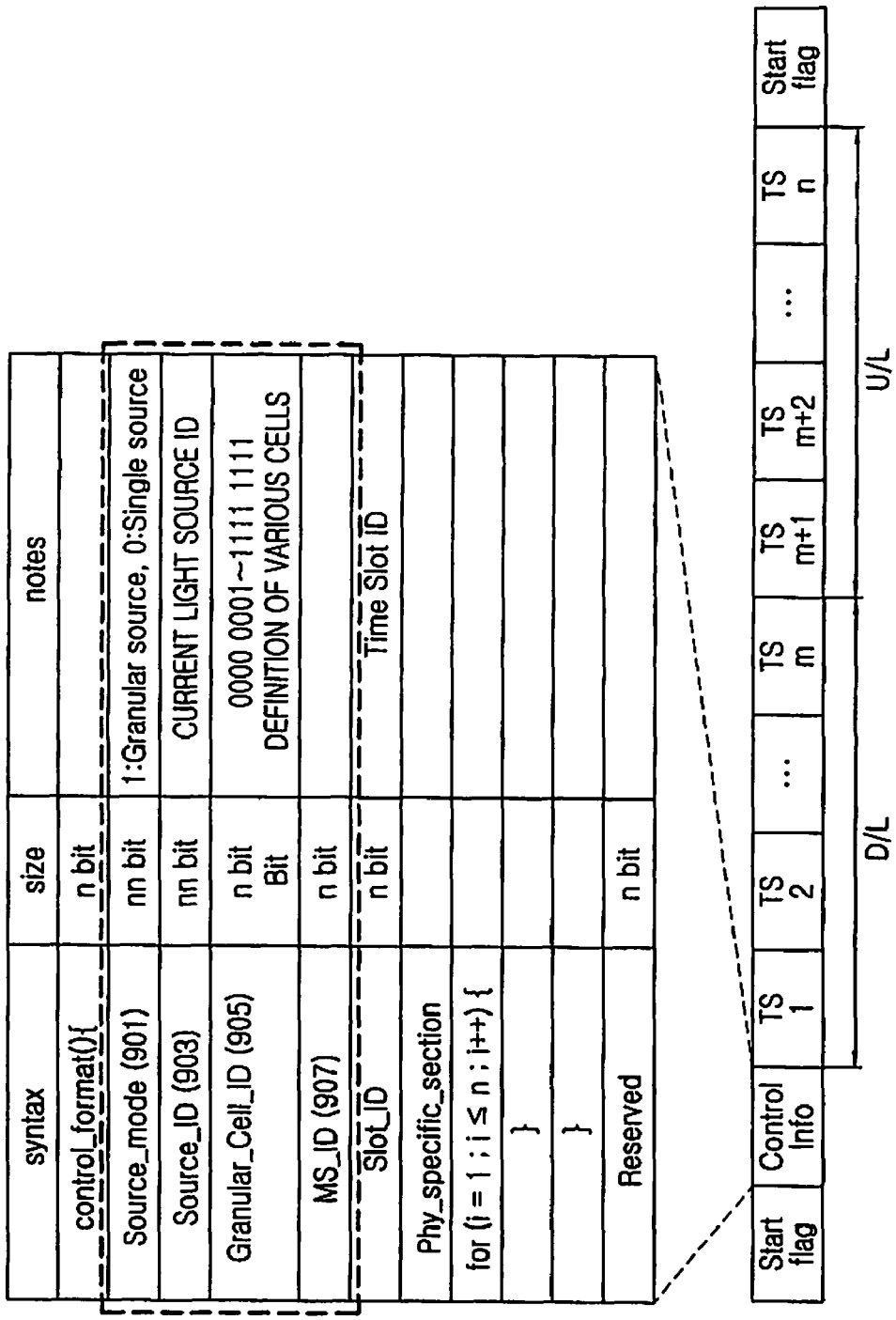
FIG. 13 illustrates a frame format according to an embodiment of the present invention.

FIG. 13 illustrates a format of control information in an uplink/downlink frame according to an embodiment of the present invention. Referring to FIG. 13, MS_ID 907 indicates an ID of a corresponding VLC terminal, and Source_mode 901 indicates a configuration mode of a cell to which the VLC terminal belongs. In one embodiment, if a bit value=0 of the Source_mode 901 indicates a single source mode, and a bit value=1 indicates a granular source mode. Source_ID 903 indicates a light source ID of a light source to which the VLC terminal currently belongs, i.e. of a service source light source. Granular_Cell_ID 905, which represents cell configuration information, indicates a cell inclusion status for adjacent light sources of the service source light source in the granular source mode. In one embodiment of the present invention, Granular_Cell_ID 905 has a value ranging from '0000 0001' to '1111 1111'. Based on the cell configuration information, the VLC terminal may determine the number of light sources mapped to the same cell, among the adjacent light sources of the current service source light source.

If Granular_Cell_ID 905 is '0000 0001', it means that one light source is included in the cell, in the center of the current service source light source in up/down/left/right directions, thereby making it possible to provide the same service. That is, all adjacent light sources are mapped to the same cell, which the VLC terminal will pass through first when moving, centering on the service source light source. Therefore, the VLC terminal may know the possibility of receiving a continuous service without a new synchronization procedure or a link setup process even though it moves to an adjacent light source. After the movement, the VLC terminal may receive the cell configuration information again from the communication control device 200 or the current service source light source.

In the single source mode, if a VLC terminal continues to move, it leaves a service area of the current cell. In this case, the VLC terminal should perform a synchronization procedure and an initialization process used to establish a communication link again with the light source in the location to which the VLC terminal moved. Because the VLC terminal knows from the Source_mode 901 that its cell is in the single source mode, the VLC terminal may previously determine that it should perform a synchronization procedure to another service source light source when it leaves the service area of the current service source light source.

The application of this method can reduce the cell initialization procedure, and Granular_Cell_ID can be used in various methods.

Figure 14A:
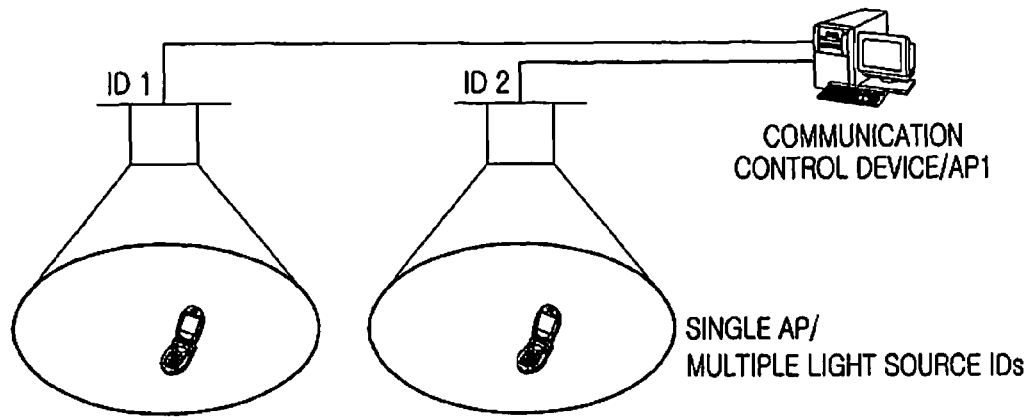
FIGS. 14A to 14D are diagrams illustrating various system network configurations according to an embodiment of the present invention.
Figure 14B:
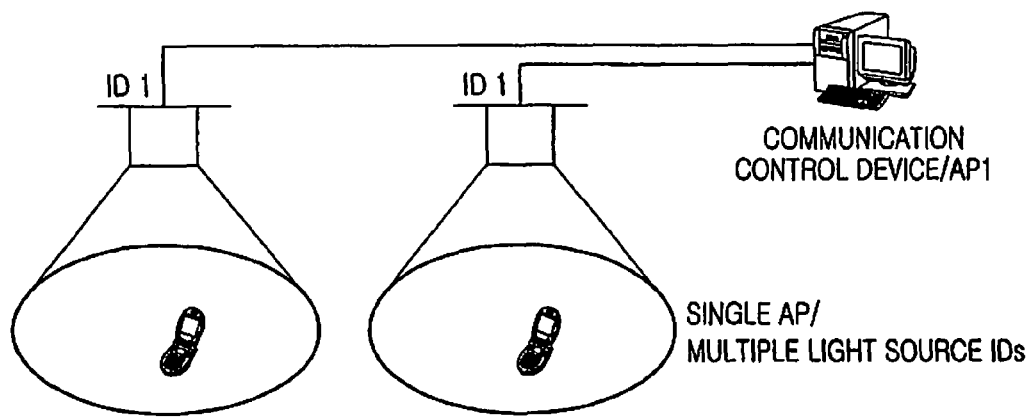
Figure 14C:
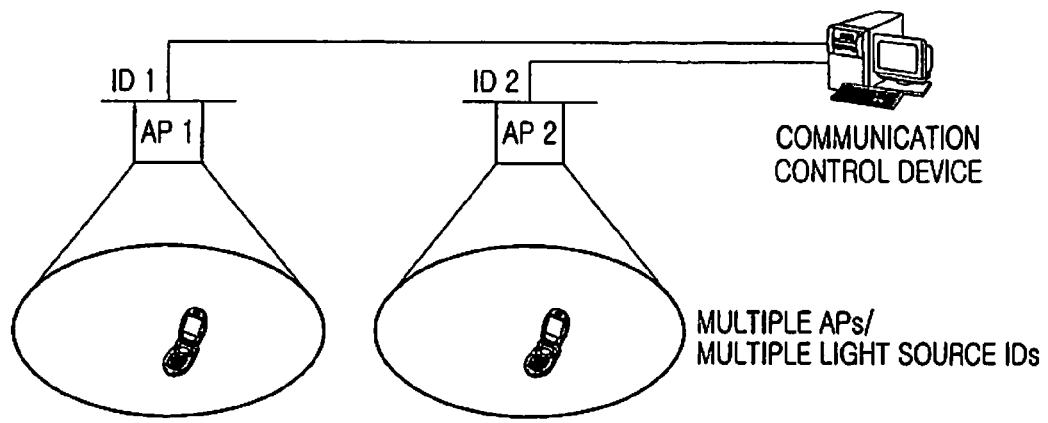
Figure 14D:
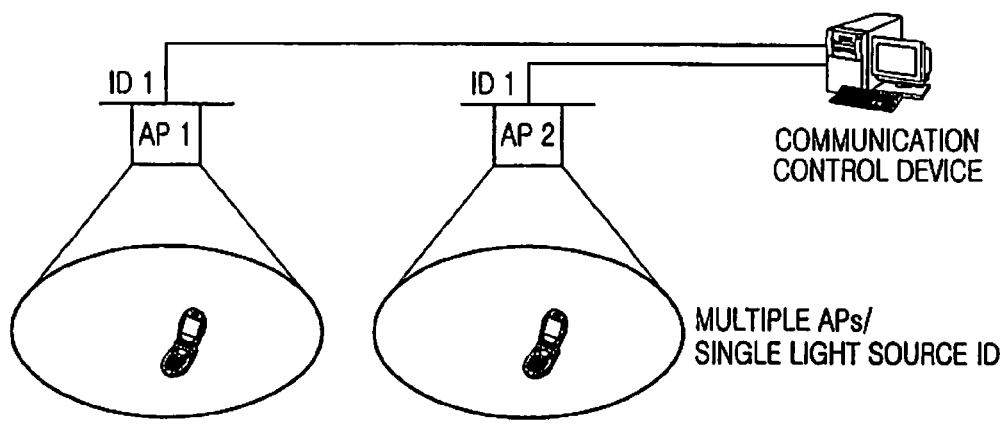

FIGS. 14A to 14D illustrate various system network configurations to which the present invention is applicable. FIG. 14A illustrates a network in which a single access point and multiple light source IDs are established, and it can be considered that one cell is formed in the entire network. In this case, the communication control device may be regarded as an access point. FIG. 14B illustrates a network in which a single access point and a single light source ID are established. Similarly, it can be considered that one cell is formed in the entire network. However, unlike in FIG. 14A, light source IDs of all light sources are equal, and because the whole network is mapped as one cell, data service is possible even though light source IDs of the light sources are equal. FIG. 14C illustrates a network in which multiple access points and multiple light source IDs are established. Here, the number of cells corresponds to the number of access points. FIG. 14D illustrates a network in which multiple access points and a single light source ID are established. Also, the number of cells corresponds to the number of access points. For different cells, light sources in the cells may use the same light source ID.

As is apparent from the foregoing description, in providing VLC services using a plurality of adjacent light sources, the present invention can provide various services to each user, and enable VLC communication even in the area where service areas of multiple light sources overlap, that provide different services. In addition, the present invention can efficiently use light sources of the VLC system, thus preventing resource waste.

Shapes of the existing cells are changed according to occurrence/termination of user services. However, new cell mapping may be made every time the user services occur and terminate. In addition, the communication control device 200 may be an access point, or may include a combination of an access point and another communication device. Further, one light source may function as the communication control device 200.

Embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, Read-Only Memory (ROM), Random-Access Memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to a certain preferred embodiments thereof, it will be understood by those skilled in the art that various changes in form and detail may be made therein without departing from the spirit and scope of the invention as defined by the appended claims and their equivalents.

What is claimed is:

1. A communication control device for providing Visible Light Communication (VLC)
   using Time Division Multiplexing (TDM) to at least one cell, wherein each cell includes two or more light sources mapped to the cell and the two or more light sources transmits data received from one or more VLC terminals to the communication control device, and transmits data received from the communication control device to the one or more VLC terminals, the communication control device comprising:

a storing device for storing information for a plurality of cells; and a processor for determining and grouping at least one light source to be included in a first cell according to a generated user service, mapping the grouped at least one light source to the first cell, allocating a time slot used to provide the user service to the first cell, transmitting data associated with the user service to a first VLC terminal through the at least one light source mapped to the first cell using the allocated time slot, detecting a location of the first VLC terminal located in a service area of the first cell on a real-time basis, determining whether an adjacent light source of a first light source corresponding to the detected location is included in the first cell, when the adjacent light source is not included in the first cell, mapping the adjacent light source to the first cell, and transmitting the data associated with the user service to the first VLC terminal through the adjacent light source.

2. The communication control device of claim 1, wherein each of the first light source and the adjacent light source has a light source Identifier (ID), wherein the first light source delivers an Acknowledgement (ACK) received from the first VLC terminal to the communication control device in response to data transmitted to the first VLC terminal, and wherein the communication control device detects a location and mobility of the first VLC terminal through the delivered the ACK.

3. The communication control device of claim 2, wherein the communication control device excludes, from the first cell, one or more non-adjacent light sources of the first light source among light sources mapped to the first cell.

4. The communication control device of claim 2, wherein the communication control device remaps the first cell using a cell light source matrix and an adjacent light source matrix, the cell light source matrix comprising a light source ID of each light source mapped to the first cell, the adjacent light source matrix comprising a light source ID of each light source that is not mapped to the first cell and is adjacent to any one of the light sources mapped to the first cell.

5. The communication control device of claim 4, wherein the light source ID included in the adjacent light source matrix is classified according to each of the light source mapped to the first cell.

6. The communication control device of claim 1, wherein the communication control device provides the first VLC terminal with a light source ID of the first light source and information on a configuration mode of the first cell.

7. The communication control device of claim 6, wherein the configuration mode comprises a single source mode indicating a cell having one light source, and a granular source mode indicating a cell having two or more light sources, and wherein in the granular source mode, the communication control device further provides cell configuration information to the first VLC terminal, the cell configuration information indicating a cell inclusion status for adjacent light sources of the first light source.

8. The communication control device of claim 7, wherein if allocation of a specific time slot is completed, the communication control device provides a notification of the allocation of the specific time slot to a VLC terminal that will use the specific time slot.

9. The communication control device of claim 8, wherein when the communication control device detects a second VLC terminal registered in the user service in a service area of a second light source adjacent to the first cell, the communication control device maps the second light source to the first cell.

10. The communication control device of claim 1, wherein the communication control device allocates different time slots to the first cell and an adjacent cell of the first cell.

11. The communication control device of claim 10, wherein all light sources included in the first cell transmit same data using a same time slot.

12. A time division Visible Light Communication (VLC) method performed by a communication control device in a VLC system, including two or more light sources that transmit data received from one or more VLC terminals to the communication control device and transmits data received from the communication control device to the one or more VLC terminals, the method comprising:

upon receipt of a request for a specific user service, determining and grouping at least one light source to be included in a first cell according to the user service, and mapping the at least one grouped light source to the first cell;

allocating a time slot used to provide the user service to the first cell;

transmitting data associated with the user service to a first VLC terminal located in a service area of the first cell through the at least one light source mapped to the first cell using the allocated time slot;

detecting a location of the first VLC terminal located in the service area;

determining whether an adjacent light source of a first light source corresponding to the detected location is included in the first cell;

when the adjacent light source is not included in the first cell, mapping the adjacent light source to the first cell; and transmitting the data associated with the user service to the first VLC terminal through the adjacent light source.

13. The time division VLC method of claim 12, wherein each of the first light source and the adjacent light source has a light source Identifier (ID), wherein the first light source delivers an Acknowledgement (ACK) received from the first VLC terminal to the communication control device in response to data transmitted to the first VLC terminal, and wherein the communication control device detects a location and mobility of the first VLC terminal through the delivered the ACK.

14. The time division VLC method of claim 13, wherein the communication control device excludes, from the first cell, one or more non-adjacent light sources of the first light source among light sources mapped to the first cell.

15. The time division VLC method of claim 14, wherein the communication control device remaps the first cell using a cell light source matrix and an adjacent light source matrix, the cell light source matrix comprising a light source ID of each light source mapped to the first cell, the adjacent light source matrix comprising a light source ID of each light source that is not mapped to the first cell and is adjacent to any one of the light sources mapped to the specific cell.

16. The time division VLC method of claim 15, wherein the light source ID included in the adjacent light source matrix is classified according to each of the light source mapped to the first cell.

17. The time division VLC method of claim 14, wherein the communication control device provides the first VLC terminal with a light source ID of the first light source and information on a configuration mode of the first cell.

18. The time division VLC method of claim 17, wherein the configuration mode comprises a single source mode indicating a cell having one light source, and a granular source mode indicating a cell having two or more light sources, and wherein in the granular source mode, the communication control device further provides cell configuration information to the first VLC terminal, the cell configuration information indicating a cell inclusion status for adjacent light sources of the first light source.

19. The time division VLC method of claim 18, wherein the communication control device allocates different time slots to the first cell and an adjacent cell of the first cell.

20. The time division VLC method of claim 19, wherein the time slot allocated to the first cell is changed by at least one of occurrence and termination of the user service associated with the first cell and a communication environment.

21. The time division VLC method of claim 19, wherein all light sources included in the first cell transmit same data using a same time slot.

22. The time division VLC method of claim 21, when the communication control device detects a second VLC terminal registered in the user service in a service area of a second light source adjacent to the first cell, the communication control device maps the second light source to the first cell.

* * * * *